(12) United States Patent
Porzio

(10) Patent No.: US 9,710,016 B1
(45) Date of Patent: Jul. 18, 2017

(54) DOCKING STATION WITH SECURING APPARATUS AND STAND FOR ELECTRONIC DEVICE

(71) Applicant: Bion Porzio, Beaverton, OR (US)

(72) Inventor: Bion Porzio, Beaverton, OR (US)

( * ) Notice: Subject to any disclaimer, the term of this patent is extended or adjusted under 35 U.S.C. 154(b) by 0 days.

(21) Appl. No.: 14/997,505

(22) Filed: Jan. 16, 2016

(51) Int. Cl.
*G06F 1/16* (2006.01)

(52) U.S. Cl.
CPC ............ *G06F 1/1632* (2013.01); *G06F 1/166* (2013.01); *G06F 1/1656* (2013.01)

(58) Field of Classification Search
CPC .............................. G06F 1/1632; G06F 1/1633
See application file for complete search history.

(56) References Cited

U.S. PATENT DOCUMENTS

| | | | | |
|---|---|---|---|---|
| 5,052,943 A | * | 10/1991 | Davis | G06F 1/1632 320/115 |
| 5,230,016 A | * | 7/1993 | Yasuda | H02J 7/0044 379/426 |
| 5,248,264 A | * | 9/1993 | Long | E05C 1/10 439/347 |
| 5,305,381 A | * | 4/1994 | Wang | B60R 11/0241 379/426 |
| 5,457,745 A | | 10/1995 | Wang | |
| 5,555,302 A | | 9/1996 | Wang | |
| 5,615,258 A | | 3/1997 | Ho | |
| 5,627,727 A | * | 5/1997 | Aguilera | G06F 1/1626 361/679.43 |
| 5,659,612 A | | 8/1997 | Wang | |
| 5,825,874 A | * | 10/1998 | Humphreys | B60R 11/0241 379/446 |
| 5,836,563 A | | 11/1998 | Hsin-Yung | |
| 5,839,919 A | | 11/1998 | Chen | |
| 5,961,016 A | | 10/1999 | Hartmann et al. | |
| 6,073,901 A | | 6/2000 | Richter | |
| 6,157,163 A | | 12/2000 | Blackwood | |
| 6,285,758 B1 | * | 9/2001 | Lu | B60R 11/0241 379/446 |
| 6,438,229 B1 | * | 8/2002 | Overy | H02J 7/0044 379/446 |
| 6,480,378 B2 | | 11/2002 | Chang | |
| 6,491,194 B2 | | 12/2002 | Marvin | |
| 6,752,299 B2 | | 6/2004 | Shetler et al. | |
| 6,785,567 B2 | * | 8/2004 | Kato | H04B 1/3877 379/433.11 |
| 6,848,662 B2 | * | 2/2005 | Paramonoff | E05C 3/14 248/222.11 |

(Continued)

*Primary Examiner* — Anthony Q Edwards

(57) ABSTRACT

An improved docking station (200) comprising a securing apparatus (20) and a stand (22) used for securing an electronic device (24) or a connector device (26) in a convenient position. The sidewalls (32,34,36) of the securing apparatus (20) have entrance guides and may be adjusted to secure different sized electronic devices (24). The stand (22) may be positioned using pivoting arms (56,58,60), base plates (52), and a mounting head (64) to conveniently display the attached securing apparatus (20). The mounting head (64) may be pulled, rotated, and released into a swivel lock (62) thus changing the position of the attached securing apparatus (20). The base plates (52) of the stand (22) may be linked together on hinges (76) and mounted to a substrate with an adhesive (70) to secure the docking station (200) in place.

12 Claims, 8 Drawing Sheets

(56) References Cited

U.S. PATENT DOCUMENTS

| | | | |
|---|---|---|---|
| D520,013 S * | 5/2006 | Yang | D14/434 |
| D540,327 S * | 4/2007 | Wong | D14/434 |
| 7,251,324 B2 | 7/2007 | Richter | |
| 7,930,004 B2 | 4/2011 | Seil et al. | |
| 8,479,960 B2 | 7/2013 | Lopez-Apodaca | |
| 8,567,737 B2 * | 10/2013 | Chen | F16M 11/041 |
| | | | 248/313 |
| 8,605,425 B2 | 12/2013 | Zhou et al. | |
| 8,780,546 B2 | 7/2014 | Zhou | |
| 9,004,434 B2 * | 4/2015 | Kang | H04M 1/04 |
| | | | 248/229.12 |
| D729,248 S * | 5/2015 | Porter | D14/434 |
| D736,210 S * | 8/2015 | Paradise | D14/434 |
| 9,450,632 B1 * | 9/2016 | McElroy | G06F 1/1632 |
| 9,509,087 B2 * | 11/2016 | Hong | G06F 1/1632 |
| 2002/0115480 A1 * | 8/2002 | Huang | H02J 7/0027 |
| | | | 455/573 |
| 2006/0111076 A1 | 5/2006 | Davie et al. | |
| 2007/0045495 A1 | 3/2007 | Asano et al. | |
| 2007/0057004 A1 | 3/2007 | Butler et al. | |
| 2007/0293277 A1 | 12/2007 | Bury | |
| 2008/0296454 A1 | 12/2008 | Carnevali | |
| 2010/0294818 A1 | 11/2010 | LaFargue et al. | |
| 2012/0298826 A1 | 11/2012 | Su | |
| 2013/0112838 A1 | 5/2013 | Duncan Seil et al. | |
| 2013/0146726 A1 | 6/2013 | Bobrow et al. | |
| 2013/0175307 A1 | 7/2013 | Izen et al. | |
| 2014/0069973 A1 | 3/2014 | Peck et al. | |

* cited by examiner

DOCKING STATION WITH SECURING APPARATUS AND STAND FOR ELECTRONIC DEVICE

CROSS-REFERENCE TO RELATED APPLICATIONS

This application claims the benefit of provisional patent application Ser. No. 62/165,745, filed 2015 May 22 by the present inventor.

BACKGROUND—PRIOR ART

The following is a tabulation of some prior art that presently appears relevant:

| U.S. Patents | | | |
| --- | --- | --- | --- |
| Pat. No | Kind Code | Issue Date | Patentee |
| 8,780,546 | B2 | 2012 Jul. 15 | Zhou |
| 7,930,004 | B2 | 2011 Apr. 19 | seil et al. |
| 5,457,745 | B1 | 1995 Oct. 10 | Wang |

| U.S. Patent Application Publications | | | |
| --- | --- | --- | --- |
| Publication Nr. | Kind Code | Publ. Date | Applicant |
| 20130146726 | A1 | 2013 Jun. 13 | Bobrow et al. |
| 20080296454 | A1 | 2008 Dec. 4 | Carnevali |

Originally docking stations were used to sync computer peripherals to laptops and other such electronic devices. As technology increased and smaller and more portable electronic devices were developed the desire for docking stations to accommodate those electronic devices also developed.

Although there are different types of docking stations on the market today there are many improvements that would be desirable. There is a demand for a docking station that would secure a portable electronic device and also connect that portable electronic device to multiple peripheral devices. The only docking stations or holders available are usually too bulky, not stable enough, don't have charging capabilities, block driving views, or only attach to specific surfaces.

Many people are too impatient to clamp their portable electronic devices to holders and then plug them into charging devices before driving off. It takes even longer to plug in an auxiliary cable that many people use to transmit music from their portable electronic devices to their stereos. Even those using wireless capabilities for audio still prefer to see their mobile electronic devices docked, especially when using a GPS function. Furthermore, some people do not implement docking stations in there automobiles specifically because a majority of those docking stations only mount to a windshield, and it obstructs their view. The docking stations that do mount to a dashboard or air vent are either not stable enough or lack convenient positioning. Some people have access to wireless chargers but still want to secure their electronic device in a convenient position with a docking station that accommodates those wireless chargers. Certain people have also expressed the desire to have a docking station accessible to them at their desk or bedside table that provides the same benefits as the aforementioned.

There are different types of docking stations used with electronic devices. Certain docking stations are specifically designed to facilitate the connection between devices. Other docking stations have some structural support in addition to connecting capabilities. Holders, holsters, and cradles are other terms used to describe apparatus that solely secure the electronic devices in a convenient position.

Docking stations, holders, and holsters do exist in prior art. Prior art examples generally include devices for securing electronic devices including clamping jaws, brackets, or fingers. There is also prior art relating to docking stations with embedded charging connectors. U.S. Pat. No. 8,780,546 B2 to Zhou (2012) discloses a docking station for an electronic device that includes a retractable and embedded docking port. Although this device allows the user to retract the charging connector, it is permanently connected to the housing structure. Furthermore, the docking station does not provide a securing apparatus nor a way to be mounted to a separate object such as a dashboard in an automobile. The flat bottom of this docking station makes it more suitable to place on a table or desk.

U.S. Pat. No. 7,930,004 B2 to Seil et al. (2011) Discloses a holder and radio frequency transmitter for electronic devices. The device is meant to enable users to transmit audio from the electronic device through radio waves. The apparatus has a goose neck base that engages into a charging socket. The housing structure provides limited support to restrain lateral movement. The charging connector is not interchangeable or removable and you are only able to mount the apparatus to a cigarette lighter.

U.S. Pat. No. 5,457,745 B1 to Wang. (1995) Discloses a mobile phone holder that is adjustable laterally and longitudinally and uses a gear to adjust the size but does not allow the holder to be secured in a permanent position. Furthermore, the mobile phone holder does not allow for depth adjustment.

There are prior art publications that disclose holders or holsters that clip or mount to certain objects. For example, Pub. No. US 2014/0069973 A1, to Peck et al. (2014) discloses a device that attaches to a shopping cart. Publication No. US 2013/0146726 A1, to Bobrow et al. (2013) discloses a holder with a mounting system for cylinder objects. These prior art disclosures have holders that secure the electrical devices in some way. However, they do not have an adjustable securing apparatus and a stand with a linking system that allows for increased stability when mounted to uneven surfaces. Furthermore, these prior art disclosures do not mention the ability to contain and secure removable connector devices. A connector device in the context of this disclosure is defined as a wired or wireless device having means of interconnecting information or energy between electronic devices.

SUMMARY

In conclusion, insofar as I am aware, there is no docking station with a securing apparatus and a stand formerly developed that allows a user to dispose an electronic device into an adjustable but secure apparatus with a guiding entrance and have the electronic device engage with one or more secured connector devices, that allows the securing apparatus to be displayed by the stand in a variety of angles, and that has a stand with mounting plates that uniquely link together on hinges to stabilize the rest of the stand even when coupled to an uneven surface such as a dashboard.

Advantages

Accordingly, several advantages of an embodiment of the current disclosure are as follows: to provide an improved docking station for securing an electronic device in a convenient position, that may be customized to fit different sized electronic devices or cases, that may secure or embed a connector device such as a charging cable, that may help align and guide an electronic device while being received, that may limit abrasion of the electronic device while being disposed in the securing apparatus, that may allow the docked electronic device to rotate and be temporarily locked in different positions, and may be mounted to different surfaces using connecting mounting plates that pivot on hinges.

DRAWINGS

These drawings are illustrated by way of example and not by way of limitation in the figure's dimensions and are not necessarily drawn to scale. The illustrations disclosed are meant to give the viewer a clear understanding of the workings of the embodiments of the current disclosure. In the drawings, closely related figures have the same number but different alphabetic suffixes.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIG. 1 is a perspective front-side view of a docking station including a securing apparatus and a stand according to one embodiment. A received electronic device is shown in phantom lines. The top double arched upper section of the back sidewall and arched shape of the upper section of the left sidewall and the right sidewall define the general shape for the brand symbol and trademark of owner Bion Porzio.

Figure 7A:
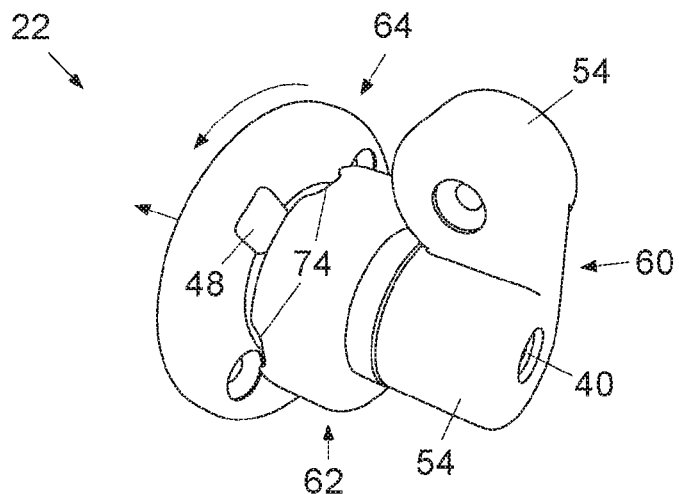
FIG. 7A is a perspective right-side view of the stand with omitted components to clearly display how the rotation locking mechanism functions according to one embodiment. The arrows indicate the general direction the components of the stand may have extended or rotated.
Figure 7B:
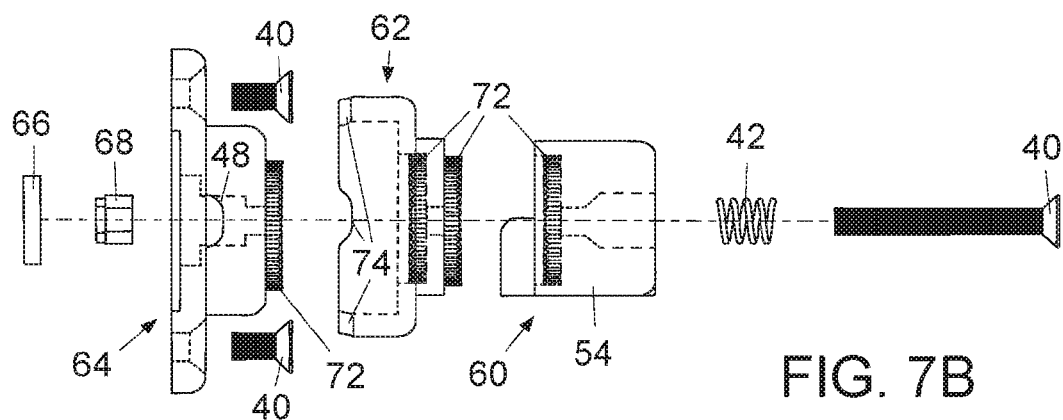

FIG. 7B is an orthogonal bottom exploded view of the stand with omitted components to illustrate how the displayed components fit together according to one embodiment. The projection lines indicate the general alignment and grouping of the components of the stand. The dashed lines show the general shape of the hidden parts of the components.

Figure 8:
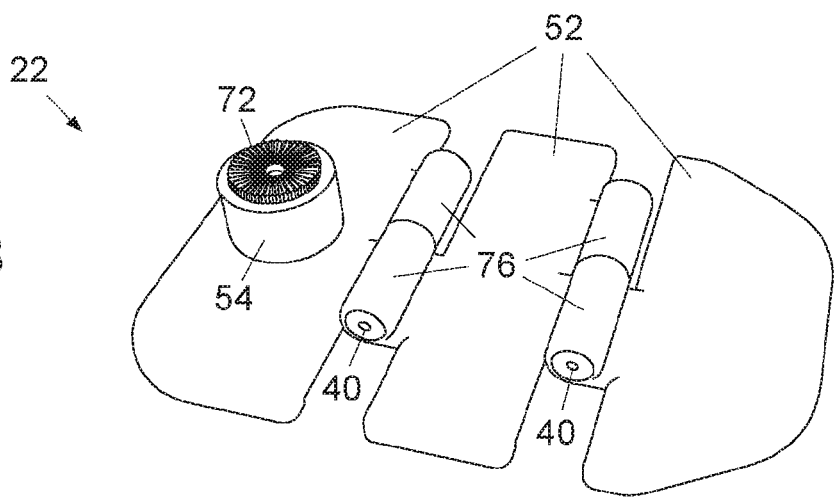

FIG. 8 is a perspective right-side view of the base plate components of the stand illustrating how additional base plates may be added according to one embodiment.

Figure 9A:
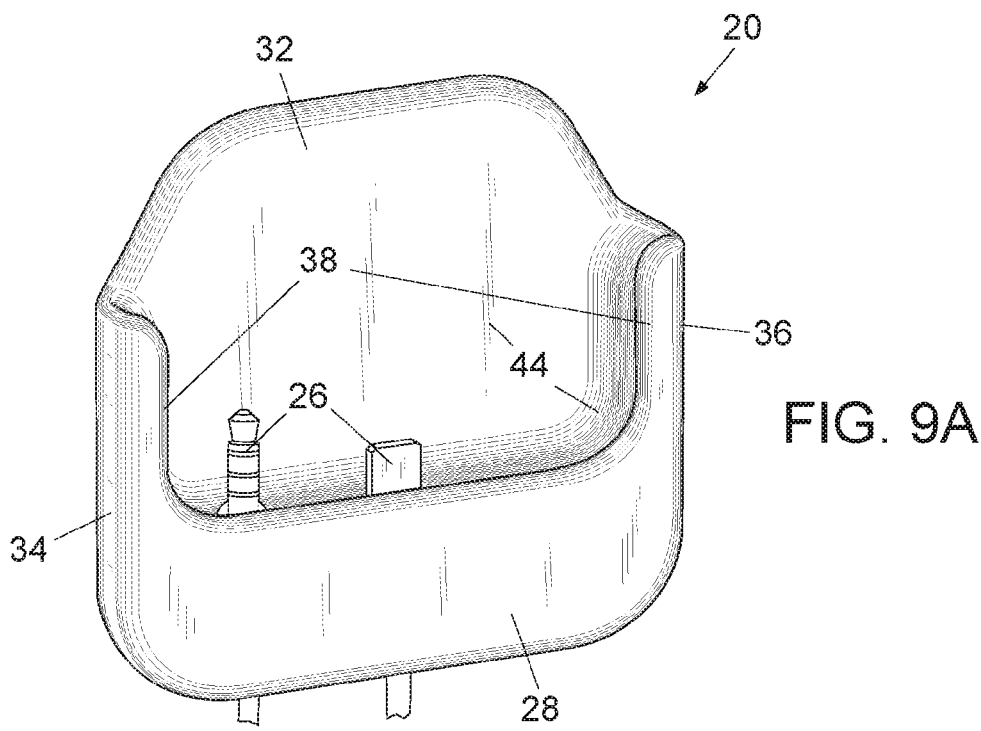

FIG. 9A is a perspective front-side view of the securing apparatus with joined components defining a unique shape and with connector devices permanently embedded according to one embodiment. The securing apparatus is shaded with a copyright notice. The top double arched upper section of the back sidewall and arched shape of the upper section of the left sidewall and the right sidewall define the general shape for the brand symbol and trademark of owner Bion Porzio.

Figure 9B:
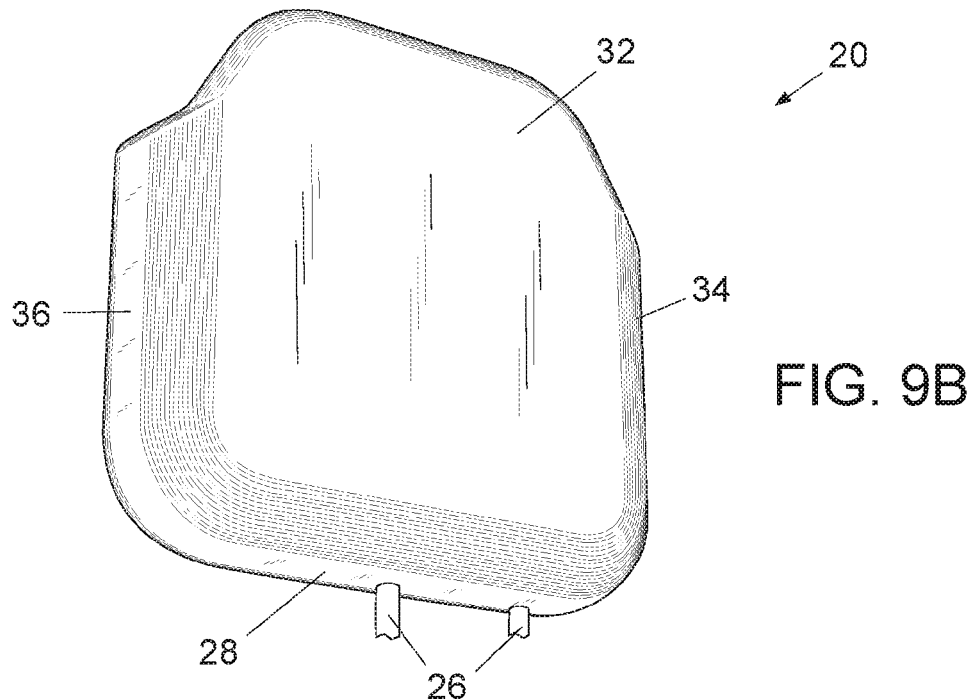

FIG. 9B is a perspective back-side view of the securing apparatus with joined components defining a unique shape and with connector devices permanently embedded according to one embodiment. The securing apparatus is shaded with a copyright notice.

The reference numerals refer to parts with the same general function through the various figures.

| REFERENCE NUMERALS | | | |
|---|---|---|---|
| 200 | Docking Station | 20 | Securing Apparatus |
| 22 | Stand | 24 | Electronic Device |
| 26 | Connector Device | 28 | Base Body |
| 30 | Supplemental Base Body | 32 | Back Sidewall |
| 34 | Left Sidewall | 36 | Right Sidewall |
| 38 | Perpendicular Sidewall | 40 | Fastener |
| 42 | Spring | 44 | Buffer |
| 46 | Mounting Plate | 48 | Alignment Key |
| 50 | Fastener Plate | 52 | Base Plate |
| 54 | Rotational Connector | 56 | Lower Arm |
| 58 | Middle Arm | 60 | Upper Arm |
| 62 | Swivel Lock | 64 | Mounting Head |
| 66 | Cover | 68 | Nut |
| 70 | Adhesive | 72 | Rotation Lock |
| 74 | Alignment Groove | 76 | Hinge |

DETAILED DESCRIPTION

Figure 1:
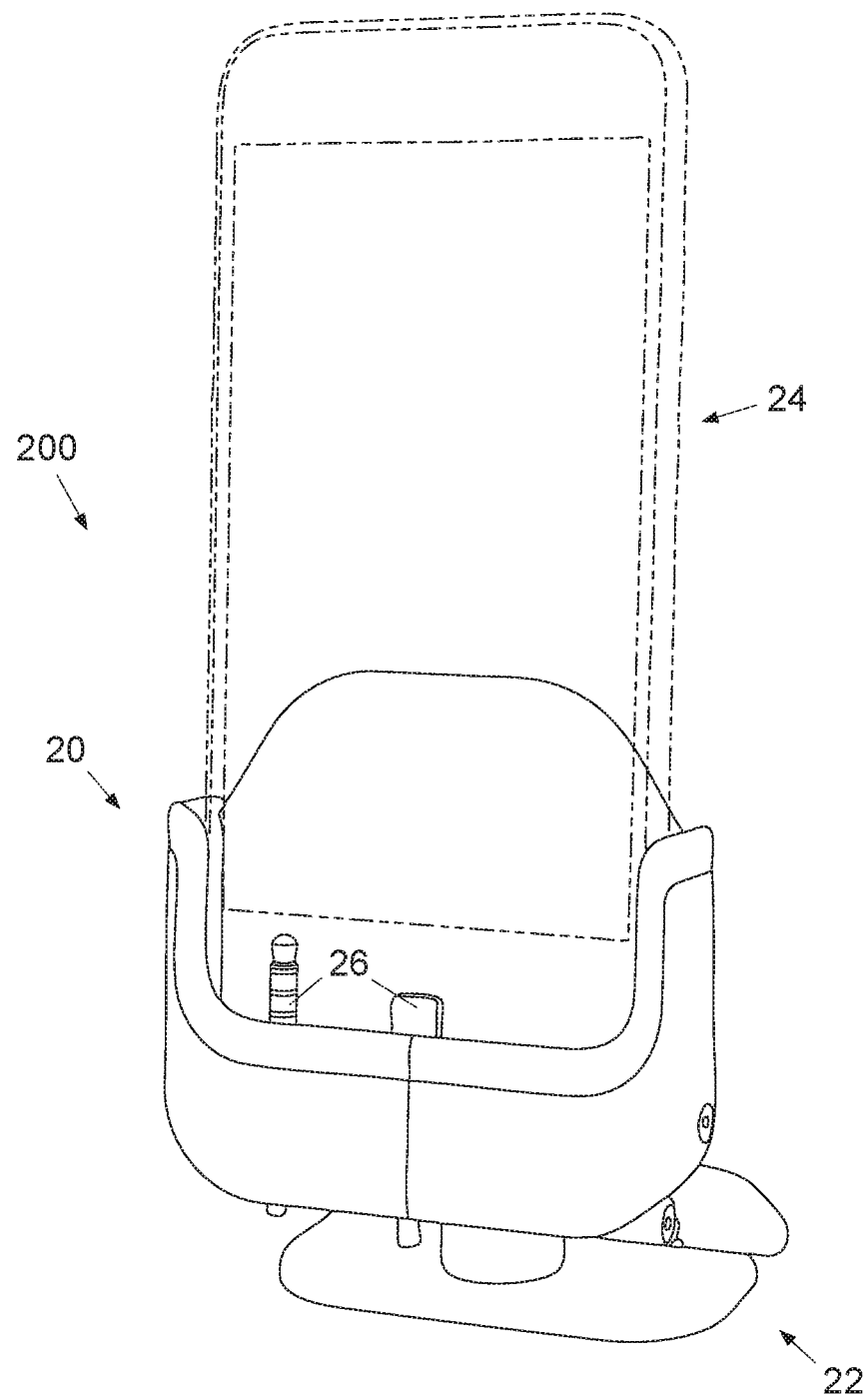

Referring to FIG. 1, the perspective front-side view of Docking Station 200, according to one embodiment, is comprised of: securing apparatus 20, and stand 22. Received electronic device 24 is shown in phantom lines disposed in securing apparatus 20. Securing apparatus 20 is shown in an upright position securing received electronic device 24 and connector devices 26. Stand 22 is shown manipulated to a convenient position displaying attached securing apparatus 20.

Electronic device 24 may be a smart-phone, mobile device, tablet, portable music device, portable gaming device, or any other portable electronic device. Electronic device 24, in one embodiment, has two ports (not shown) located on the bottom surface for receiving connector devices 26. Connector devices 26 may be APPLE brand trademarked LIGHTNING cable connectors, micro-USB connectors, USB connectors, auxiliary cable connectors, wireless charging connectors, and any other peripheral device that may exchange information or energy to and from electronic device 24.

Figure 2A:
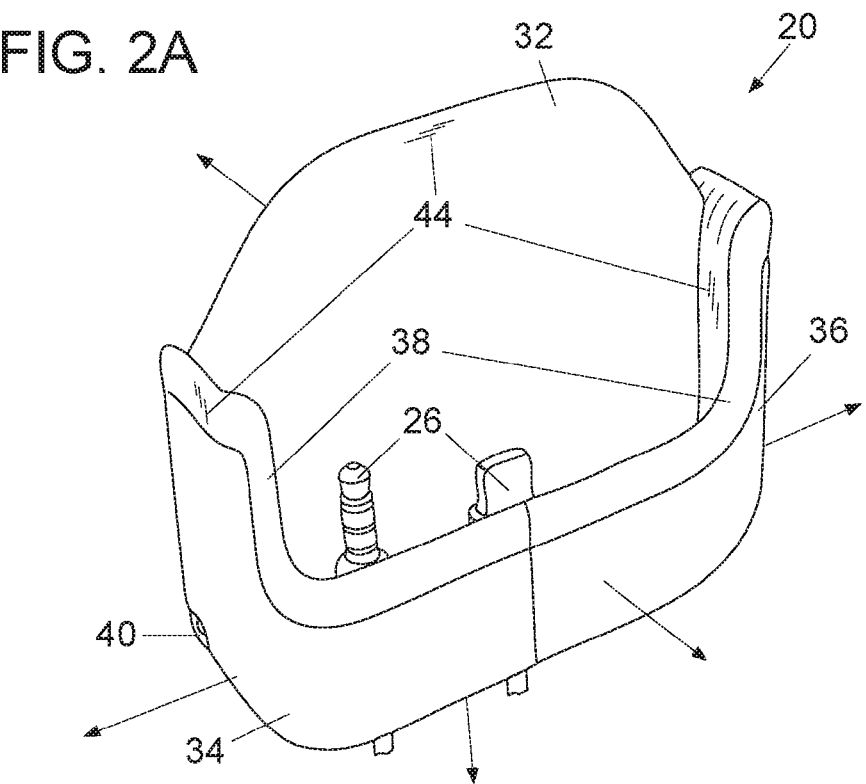
FIG. 2A is a perspective front-side view of the securing apparatus of the docking station in a non extended position according to one embodiment.
Figure 2B:
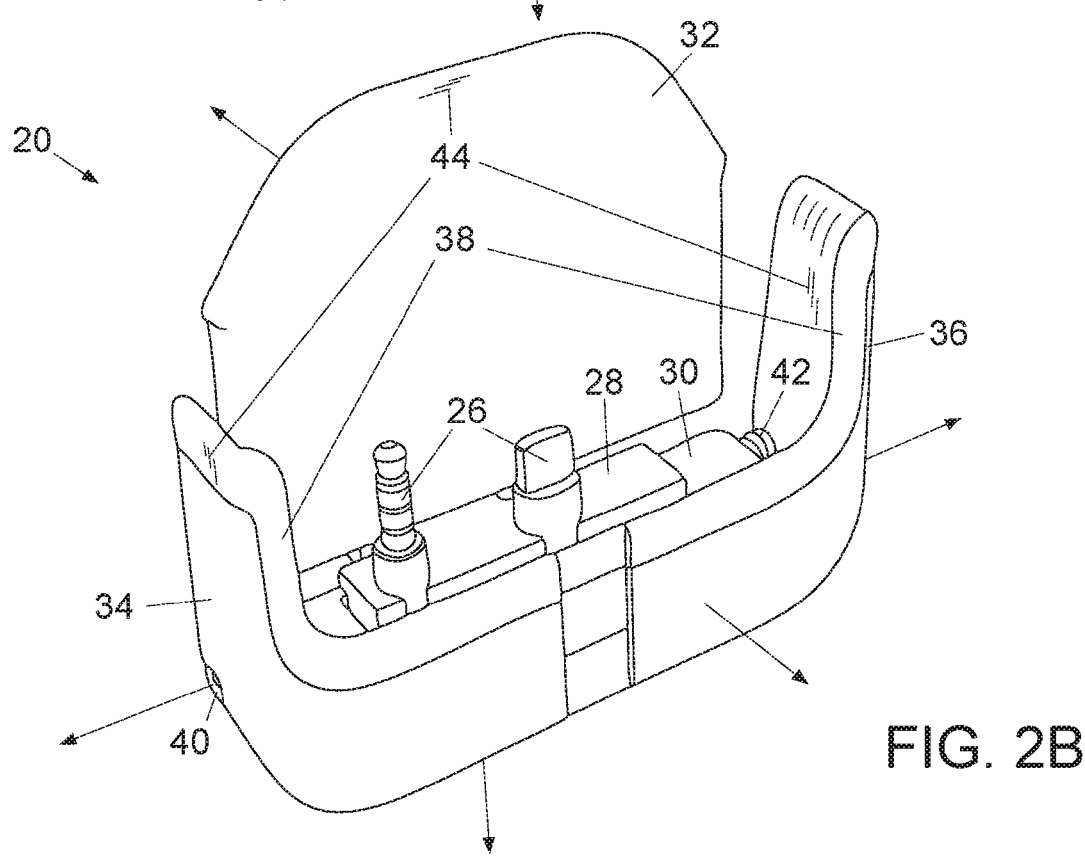
FIG. 2B is a perspective front-side view of the securing apparatus of the docking station in an extended position according to one embodiment.

Referring to FIGS. 2A and 2B, securing apparatus 20, according to one embodiment, is illustrated from the perspective front-side view in a non extended position shown in FIG. 2A and in an extended position shown in FIG. 2B. The arrows indicate the general direction of which the components of securing apparatus 20 may extend.

Securing apparatus 20 is comprised of: base body 28, supplemental base body 30, back sidewall 32, left sidewall 34, right sidewall 36, fasteners 40 (all not shown), springs 42 (all not shown), and buffer 44. Connector devices 26 are shown secured in base body 28. At present I contemplate the material used for securing apparatus 20 to be of a rigid plastic material, but other materials are suitable.

Base body 28 is comprised of a generally rectangular shape having hollowed-out bodies recessed into the surfaces for accommodating connector devices 26, fasteners 40, and alignment keys 48. Base body 28 is sufficiently sized to at least partially fit between supplemental base body 30 and back sidewall 32, left sidewall 34, or right sidewall 36.

Alignment keys 48 are generally solid shaped objects that protrude from attached components and fit into receiving slots of reciprocating components to help align and secure. They may be rectangular or cylinder in shape, but other shapes are suitable.

Supplemental base body 30 is comprised of multiple shapes that compliment the surrounding components. Supplemental base body 30 has hollowed-out bodies recessed into the surface for accommodating base body 28, connector devices 26, fasteners 40, springs 42, and alignment keys 48. Supplemental base body 30 is sufficiently sized to fit between base body 28, left sidewall 34, and right sidewall 36 while assembled.

Back sidewall 32 is of a generally planar shape and has a generally rounded or arched upper section partly defining a trade symbol and guide to help align electronic device 24 (not shown) while being disposed therein.

Left sidewall 34 and right sidewall 36 have a generally planar or contoured surface symmetrically shaped to mirror each other longitudinally, and are generally perpendicular to back sidewall 32. The lower sections of left sidewall 34 and right sidewall 36 are elongated to at least partially cover base body 28 and supplemental base body 30 when assembled. Left sidewall 34 and right sidewall 36 have a protruding perpendicular sidewall 38 that partially covers and secures the front of received electronic device 24 (not shown). Left sidewall 34 and right sidewall 36 have upper sections that arch outwards partly defining a trade symbol and guide to help align electronic device 24 (not shown) while being disposed therein.

Fastener 40 is shown as a flat socket screw securing left sidewall 34 to supplemental base body 30, but I contemplate a bolt may also be suitable.

Spring 42 is defined as an elastic compression object shown as a metal compression spring that fits over fastener 40 and is compressed between right sidewall 36 and supplemental base body 30 to limit movement.

Buffer 44 is a cushioning surface that reduces abrasion to receiving electronic device 24 (not shown) and is shown as part of left sidewall 34, right sidewall 36, and back sidewall 32.

Referring to FIG. 2B, securing apparatus 20, according to one embodiment, is illustrated extended in an alternate position. Fasteners 40 (not all shown) have been manipulated to secure supplemental base body 30, back sidewall 32, left sidewall 34, right sidewall 36, and springs 42 (not all shown) in an alternate position.

Figure 3A:
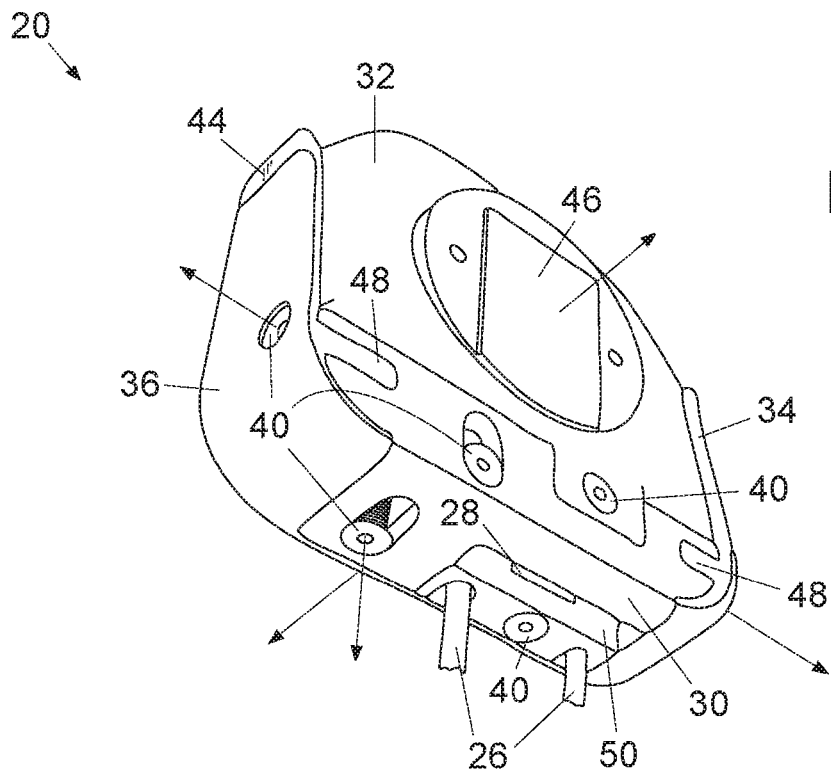
FIG. 3A is a perspective back-side bottom view of the securing apparatus of the docking station in a non extended position according to one embodiment. The arrows indicate the general direction of which the components of the securing apparatus may extend.
Figure 3B:
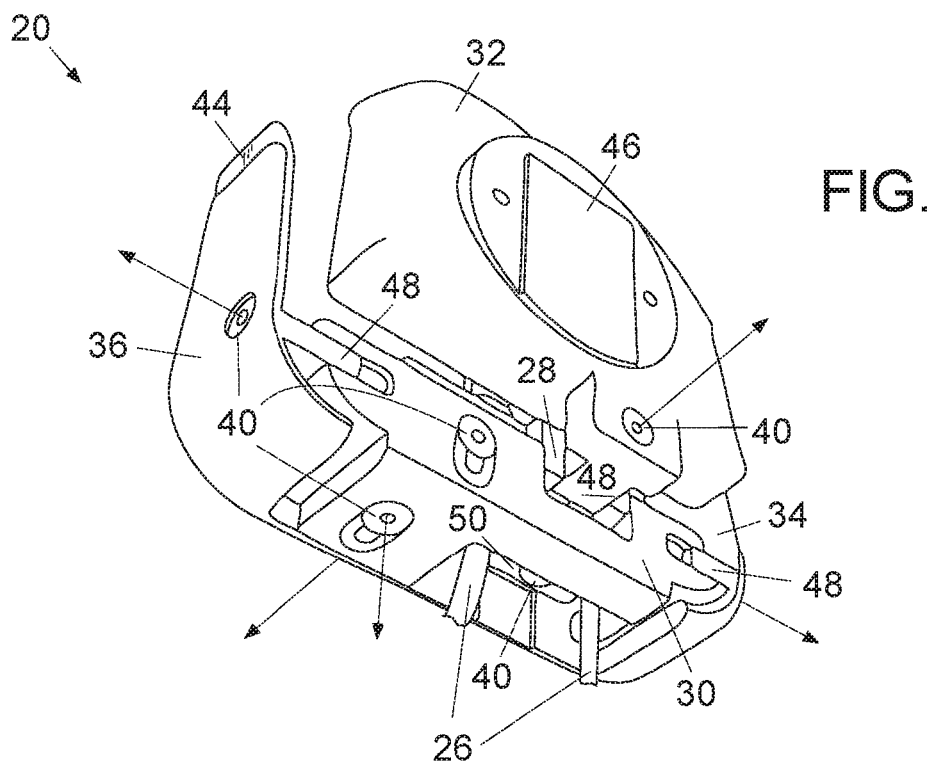
FIG. 3B is a perspective back-side bottom view of the securing apparatus of the docking station in an extended position according to one embodiment. The arrows indicate the general direction of which the components of the securing apparatus have extended.

Referring to FIGS. 3A and 3B, securing apparatus 20, according to one embodiment, is illustrated from a perspective back-side bottom view in a non extended position shown in FIG. 3A and in an extended position shown in FIG. 3B. The arrows indicate the general direction of which the components of securing apparatus 20 may extend.

Supplemental base body 30 further comprises access openings allowing fasteners 40 to partially pass through. The generally larger access openings of supplemental base body 30 allow at least partial perpendicular movement relative to fasteners 40.

Back sidewall 32 further comprises a bottom section generally rectangular in shape with access openings to allow fastener 40 to partially pass through. Back sidewall 32 further comprises mounting plate 46 that is defined as a generally circular shape that protrudes from the back surface of back sidewall 32. Mounting plate 46 has two hollowed-out bodies recessed into opposing sides to accommodate fasteners 40. Mounting plate 46 has a rectangular shape protruding from the center to help align and secure reciprocating mounting head 64 of stand 22.

Left sidewall 34, right sidewall 36, and back sidewall 32 are shown with alignment keys 48 that protrude perpendicularly into hallowed-out slots in supplemental base body 30.

Fastener plate 50 is a generally rectangular shaped object that has grooves, contours, and an access opening to accommodate corresponding fastener 40 and connector devices 26. Fastener plate 50 further comprises alignment keys 48 (not shown) that protrude to fit into the hollowed-out bodies of base body 28. Fastener plate 50 is shown secured with corresponding fastener 40 to base body 28 and consequently securing disposed connector devices 26.

Figure 4A:
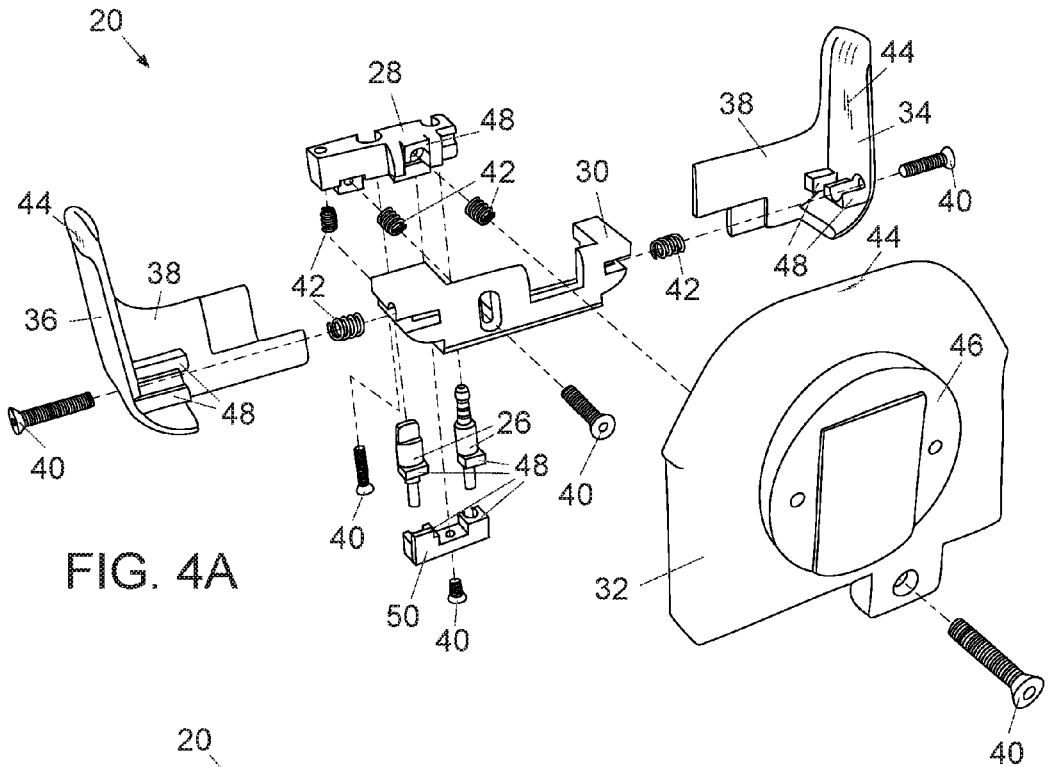
FIG. 4A is a perspective back-side exploded view of the securing apparatus of the docking station according to one embodiment. The projection lines indicate the general alignment and grouping of the components of the securing apparatus.
Figure 4B:
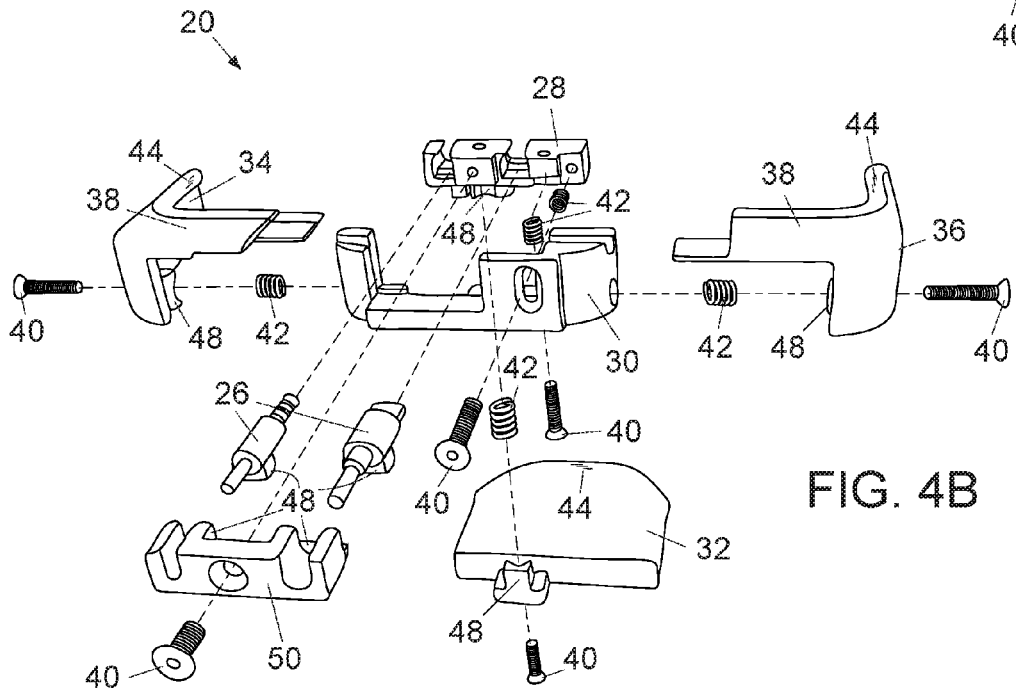
FIG. 4B is a perspective bottom exploded view of the securing apparatus of the docking station according to one embodiment. The projection lines indicate the general alignment and grouping of the components of the securing apparatus.

Referring to FIG. 4A and FIG. 4B, securing apparatus 20, according to one embodiment, is illustrated from a front-side perspective exploded view shown in FIG. 4A and a bottom perspective exploded view shown in FIG. 4B. The projection lines indicate the general alignment and grouping of the components of securing apparatus 20. Fasteners 40 are shown as socket screws of a generally similar shape but not necessarily of the same length.

Connector devices 26 are shown with alignment keys 48 to limit movement while disposed in base body 28. Base body 28, supplemental base body 30, and back sidewall 32 are shown with hollowed-out bodies recessed into the surface and access openings for accommodating respective fasteners 40, alignment keys 48, or connector devices 26. Supplemental base body 30 is shown aligned to left sidewall 34, right sidewall 36, corresponding fasteners 40, and corresponding springs 42. Supplemental base body 30 is shown with hollowed-out bodies and for accommodating fasteners 40 and alignment keys 48. Left sidewall 34 and right sidewall 36 are shown with protruding alignment keys 48 limiting movement while disposed in supplemental base body 30. Perpendicular sidewalls 38 are shown elongated to partially surround base body 28, supplemental base body 30, and disposed electronic device 24 (not shown). Fastener plate 50 is shown with alignment keys 48 protruding upwards, and an access opening for corresponding fastener 40 to partially pass through. Springs 42 are of sufficient size to partially surround corresponding fasteners 40 and limit movement when constrained. Buffer 44 is shown as part of the interior of left sidewall 34, and the exterior of right sidewall 36. I contemplate Buffer 44 be part of the same general area of both left sidewall 34 and right sidewall 36.

Figures 5A, 5B:
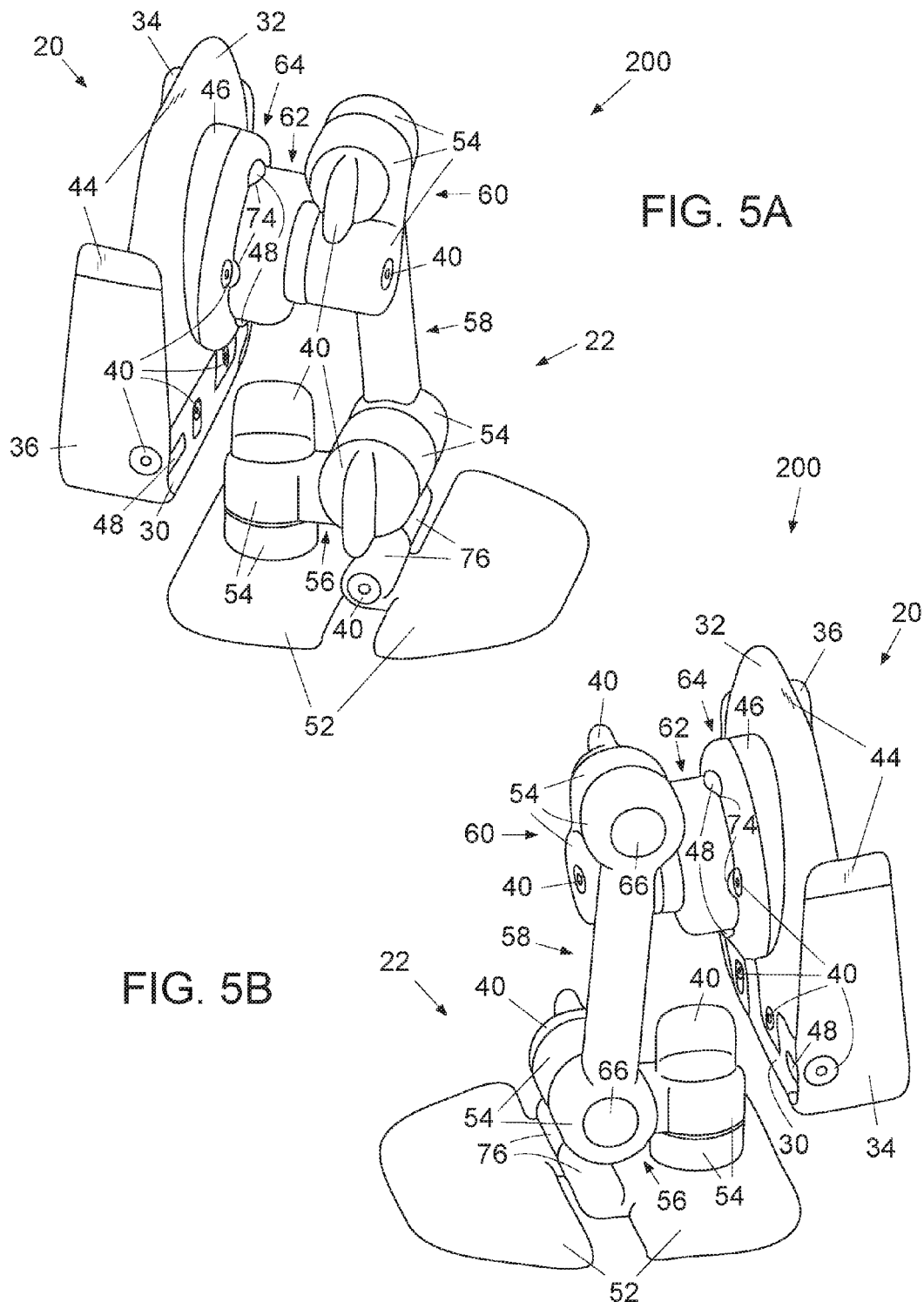
FIG. 5A is a perspective right-side view of the stand and the securing apparatus of the docking station assembled in an upright position according to one embodiment.
FIG. 5B is a perspective left-side view of the stand and the securing apparatus of the docking station assembled in an upright position according to one embodiment.

Referring to FIG. 5A and FIG. 5B, Docking station 200, according to one embodiment, is illustrated in an assembled and generally upright position from a left perspective view shown in FIG. 5A and a right perspective view shown in FIG. 5B. Securing apparatus 20 is shown attached to stand 22 with corresponding fasteners 40. Fastener 40 is shown as a hand-turn screw or a socket screw. At present I contemplate the material used for stand 22 to be of a rigid plastic material, but other materials are suitable.

Stand 22 is comprised of: base plates 52, rotational connectors 54, lower arm 56, middle arm 58, upper arm 60, swivel lock 62, mounting head 64, covers 66, nuts 68 (not shown), and fasteners 40.

Each base plate 52 is of a generally planar shape and is shown with hinge 76 as part of one side and secured together with corresponding fastener 40.

Hinge 76 is of a generally cylinder shape with thickness to accommodate corresponding fastener 40, and depth to substantially support base plates 52. One of base plates 52 is shown with a rotational connector 54 embedded in the upper surface. I contemplate that rotational connector 54 may be embedded in any of base plates 52.

Rotational connectors 54 are generally cylinder in shape with a hollowed-out center to accommodate fasteners 40, nuts 68 (not shown), covers 66, or rotation locks 72 (not shown). Rotational connectors 54 are shown secured together with respective fastener 40, nut 68 (not shown), and cover 66 attached on one side to hide inner parts.

Lower arm 56 is a generally elongated rectangular or cylinder shaped object with thickness to support the rest of docking station 200. Lower arm 56 has two rotational connectors 54 on each apposing side that face perpendicular to each other. Vertically facing rotational connector of lower arm 56 connects to the corresponding rotational connector 54 of base plates 52.

Middle arm 58 is similar to lower arm 56 but is more elongated and both rotational connectors 54 face horizontally and generally in the same direction. The lower rotational connector 54 of middle arm 58 connects to reciprocating horizontal rotational connector 54 of lower arm 56.

Upper arm 60 is similar to lower arm 56 but is shown in a different position with one rotational connector 54 facing an alternate direction. The upper rotational connector 54 of middle arm 58 connects to corresponding upper horizontal rotational connector 54 of upper arm 60. Lower horizontal but perpendicular rotational connector 54 of upper arm 60 connects to swivel lock 62. I contemplate that additional arms may be added if so desired.

Swivel lock 62 is defined as a generally cylinder shaped object with two rotation locks 72 (not shown) attached on each opposing side, and a hollowed-out body to partially surround mounting head 64. Swivel lock 62 has alignment grooves 74 on four apposing sides recessed into the surface facing alignment keys 48 of mounting head 64. Swivel lock 62 may be omitted and the lower rotational connector 54 of upper arm 60 may connect to mounting head 64 alternatively.

Mounting head 64 is a generally cylinder shaped object with embedded rotational connector 54 (not shown) and two apposing alignment keys 48 facing longitudinally to fit into two of the four alignment grooves 74 (all not shown) of swivel lock 62 while engaged. There are two access openings in each apposing horizontal side of mounting head 64 to accommodate corresponding fasteners 40.

Vertical and horizontal alignment references of the current disclosure refer to positions of components in the illustrated figures and are not to be misconstrued as limitations to the dimensions of the disclosed embodiments.

Figure 6A:
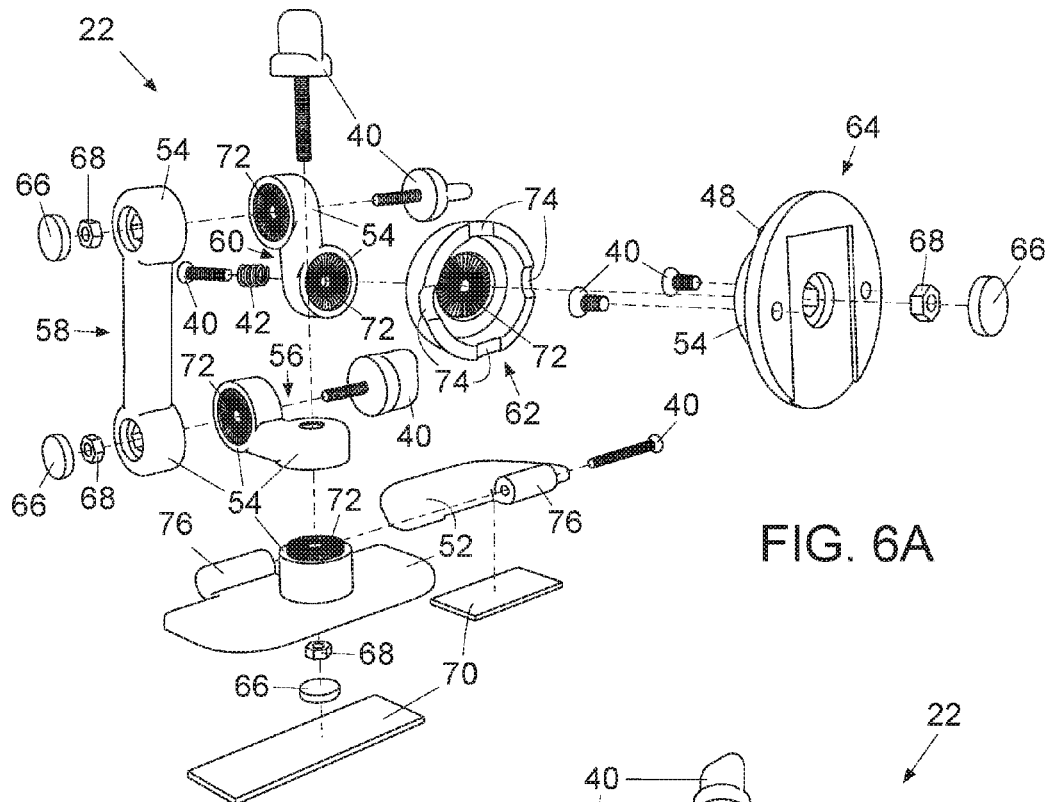
FIG. 6A is a perspective front-side exploded view of the stand of the docking station according to one embodiment. The projection lines indicate the general alignment and grouping of the components of the stand.
Figure 6B:
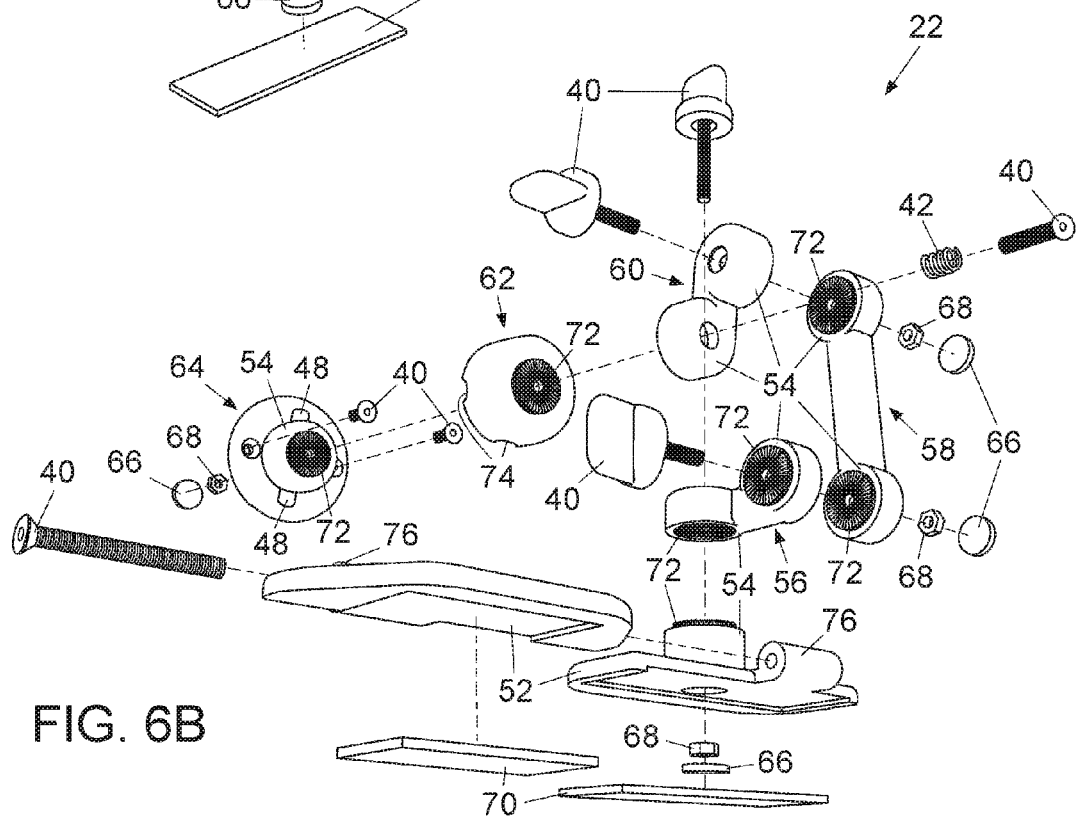
FIG. 6B is a perspective back-side exploded view of the stand of the docking station according to one embodiment. The projection lines indicate the general alignment and grouping of the components of the stand.

Referring to FIG. 6A and FIG. 6B, stand 22, according to one embodiment, is illustrated from a front-side perspective exploded view shown in FIG. 6A and a back-side perspective exploded view shown in FIG. 6B. The projection lines indicate the general alignment and grouping of the components of stand 22. Fasteners 40 are shown as socket screws or hand turn screws, and are not all of the same length.

Adhesive 70 is shown as double sided mounting foam tape in a generally rectangular shape that couples to the bottom surface of base plate 52.

Cover 66 is a generally planar and cylinder shaped object. Covers 66 fit into or are embedded in the hallowed-out bodies of rotational connectors 54 to hide disposed nuts 68.

Nut 68 is defined as generally hexagonal shaped rigid object with an access opening and threading that fastens generally to a screw or bolt. Nuts 68 are embedded in or fit into hallowed-out bodies of rotational connectors 54 with access to corresponding fasteners 40.

Rotation lock 72 is a generally cylinder object with raised triangular grooves arranged around the center defining teeth that restrict movement when secured to corresponding rotation lock 72. Rotation lock 72 is shown embedded in multiple rotational connectors 54.

Alignment grooves 74 are shown as four grooves recessed into the surface of swivel lock 62 and may line up with reciprocating alignment keys 48 of mounting head 64. Alignment keys 48 of mounting head 64 are shown as elevated and generally rectangular objects that accommodate the recessed area of reciprocating alignment grooves 74 of swivel lock 62.

Spring 42 of stand 22 is shown sandwiched between fastener 40 and rotational connector 54 of upper arm 60. Spring 42 of upper arm 60 may limit the movement of mounting head 64 while attached to corresponding fastener 40.

Fasteners 40 of the hand-turn screw type are shown as generally cylinder shaped objects with a threaded and generally cylinder shaped object protruding from the base, and a generally rectangular shape protruding from the upper surface defining a handle. Fasteners 40 of the hand-turn type and of the socket screw type may be interchangeable in securing stand 22.

Referring to FIGS. 7A and 7B, stand 22, according to one embodiment, is illustrated from a perspective right-side view shown in FIG. 7A and from an orthogonal exploded bottom view shown in FIG. 7B with omitted components to illustrate a rotation locking mechanism.

Referring to FIG. 7A, Mounting head 64 is shown extended and rotated counterclockwise in mid operation to illustrate the method in which alignment grooves 74 of swivel lock 62 may temporarily unlock from alignment keys 48 of mounting head 64 while being manipulated. Fastener 40 is shown pulled into the hallowed-out body of upper arm 60 resulting from the manipulation of mounting head 64. Spring 42 (not shown) is being compressed between fastener 40 and lower rotational connector 54 of upper arm 60. Spring 42 (not shown) is applying force to fastener 40 and may consequently pull mounting head 64 back towards swivel lock 62 when mounting head 64 is released.

Referring to FIG. 7B, the alignment of parts are shown with projection lines. Dashed lines are shown to illustrate how the hidden shapes of shown components fit together when assembled. Swivel lock 62 may be omitted and rotational connector 54 of upper arm 60 may alternately connect to mounting head 64. Mounting head 64 may rotate when rotation lock 72 and alignment keys 48 of mounting head 64 disengage from the corresponding inner rotation lock 72 and alignment grooves 74 of swivel lock 62.

Referring to FIG. 8, stand 22, according to one embodiment, is illustrated from a perspective right-side view and is shown with omitted components and an additional middle base plate 52. The middle base plate 52 is shown with two hinges 76 on apposing sides connected to the corresponding hinges 76 of reciprocating base plates 52 using corresponding fasteners 40. Additional base plate 52 may be added to increase adhesion and support to stand 22.

Referring to FIGS. 9A and 9B, securing apparatus 20, according to one embodiment, is illustrated from a perspective front-side view shown in FIG. 9A and a perspective back-side view shown in FIG. 9B shaded with a copyright notice. At present I contemplate the material used for securing apparatus 20 to be of a rigid plastic material, but other materials are suitable.

Connector devices 26 are shown partly embedded inside and permanently connected to securing apparatus 20. Base body 28, back sidewall 32, left sidewall 34, right sidewall 36, and perpendicular sidewall 38 are shown as joined components.

Operation

The manner of using docking station 200, according to one embodiment, is as follows: Stand 22 may be mounted from base plates 52 with adhesive 70 to a substrate (not shown). Assembled lower arm 56, middle arm 58, upper arm 60, swivel lock 62, and mounting head 64 may be manipulated to a position to conveniently display securing apparatus 20. Fasteners 40 of stand 22 may be tightened temporarily locking components of stand 22 in position.

Electronic device 24 may engage with connector devices 26 of securing apparatus 20 in an extended position. Fasteners 40 of supplemental base body 30, back sidewall 32, left sidewall 34, and right sidewall 36 may be tightened until electronic device 24 is secured in each direction. Securing apparatus 20 may then be secured to mounting head 64 of stand 22 with corresponding fasteners 40.

Electronic device 24 may now disengage and engage with securing apparatus 20 and be guided and secured while being disposed therein. Securing apparatus 20 may be manipulated to temporarily disengage mounting head 64 from swivel lock 62 and be rotated and released to reengage mounting head 64 with swivel lock 62 in an alternate position. Connector devices 26 may disengaged from base body 28 of securing apparatus 20 when corresponding fastener 40 and fastener plate 50 is removed. Additional base plates 52 may be connected for increased adhesion and stability of stand 22 when mounted.

CONCLUSION, RAMIFICATIONS, AND SCOPE

Accordingly, the reader will see that the docking station in the disclosed embodiments may be used to secure and protect a received electronic device. The docking station may be used to secure connector devices that may also engage with the received electronic device. The securing apparatus of the docking station is shaped to help guide the electronic device, with limited abrasion, when disposed therein. In addition, the connector devices in one embodiment are not permanently affixed and can be removed if desired. The docking station may be mounted to a separate object and be conveniently displayed. Future embodiments of the docking station may accommodate electronic devices not yet created at the time of this disclosure.

Although the descriptions heretofore contain many specific details, these should not be construed as limiting the scope of the embodiments but as merely providing illustrations of some of several embodiments. For example, the docking station may be of different shapes and sizes to accommodate different sized electronic devices, electronic device cases, or environments. The docking station can also be composed of different material such as metal, polycarbonate, carbon fiber, thermal plastic, etc. The scope of the embodiments should be determined by the broad general meaning of the terms in the appended claims and their legal equivalents, rather than by the examples given.

I claim:

1. A securing apparatus of a substantially rigid material comprising a base body of a generally rectangular shape, a supplemental base body of a generally rectangular shape, a back sidewall having at least one generally planar face distal from said base body, and at least a left or right sidewall having at least one generally planar face distal from said supplemental base body defining components of said securing apparatus; and having means to at least partially secure an electronic device or a connector device from movement in at least one direction; wherein at least one of said components of said securing apparatus is not joined to said other components having means to move independently in at least one direction relative to at least one other said component; and wherein said supplemental base body is at least partially secured to said left sidewall or said right sidewall in at least one direction while being at least partially secured to said base body in at least one direction; whereby said supplemental base body may change the position of said left sidewall or said right sidewall when manipulated.

2. The securing apparatus of claim 1 wherein the upper section of said left sidewall or said right sidewall arches outwards having means to at least partially align said electronic device while being disposed into said securing apparatus.

3. The securing apparatus of claim 1 wherein the upper edge of said back sidewall is distal from the upper edge of said left sidewall or said right sidewall having means to at least partially align said electronic device while being disposed into said securing apparatus.

4. The securing apparatus of claim 1 wherein at least one of said base body, said back sidewall, said left sidewall, or said right sidewall has a substantially perpendicular sidewall distal from at least one side; and having means to at least partially secure said electronic device from movement in at least one direction.

5. The securing apparatus of claim 1 wherein at least two of said components are at least partially secured to each other.

6. The securing apparatus of claim 1 wherein at least part of the surface of said securing apparatus is of a less abrasive material than said rigid material having means to limit scratching to said electronic device when in contact.

7. The securing apparatus of claim 1 wherein said connector device is defined as a wired or wireless device having means of interconnecting information or energy between electronic devices.

8. The securing apparatus of claim 7 wherein said connector device is further defined as an adapter having means to connect devices of different shapes or connection methods and enabling them to fit or work together.

9. The securing apparatus of claim 1 wherein said securing apparatus comprises at least one fastener, cover plate, or hallowed-out body having means to at least partially secure said connector device to said securing apparatus in at least one direction; whereby said electronic device can communicate with said connector device when disposed in at least a close proximity.

10. The securing apparatus of claim 1 wherein said securing apparatus has at least one said connector device embedded in at least part of said securing apparatus having means for said electronic device to communicate with said connector device when disposed in at least a close proximity.

11. The securing apparatus of claim 7 wherein at least one elastic compression object is constrained between at least two of said components, and having means to limit movement of said components in at least one direction.

12. The securing apparatus of claim 1 wherein at least one fastener is at least partially secured to at least two of said components, and having means to limit movement of said components in at least one direction.

* * * * *